Feb. 14, 1956  C. G. REYNOLDS  2,734,960
SAFETY SIGNAL DEVICE FOR HYDRAULIC BRAKE SYSTEMS
Filed Oct. 5, 1953
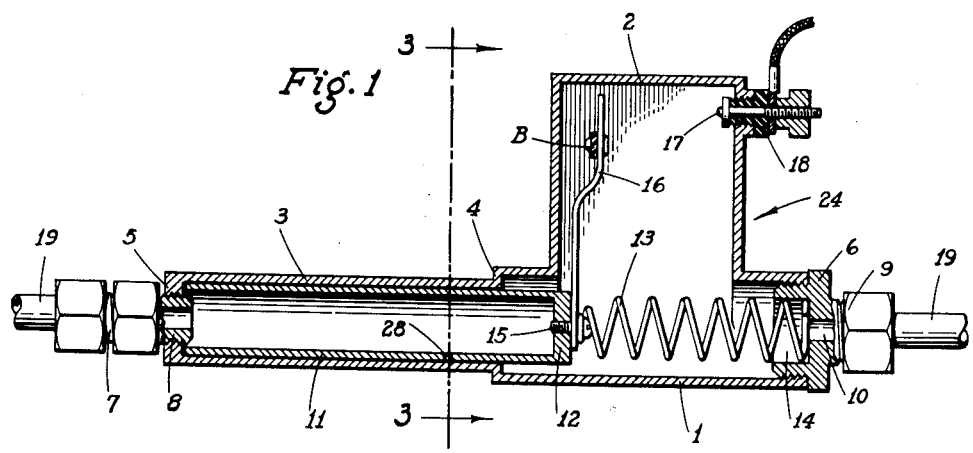
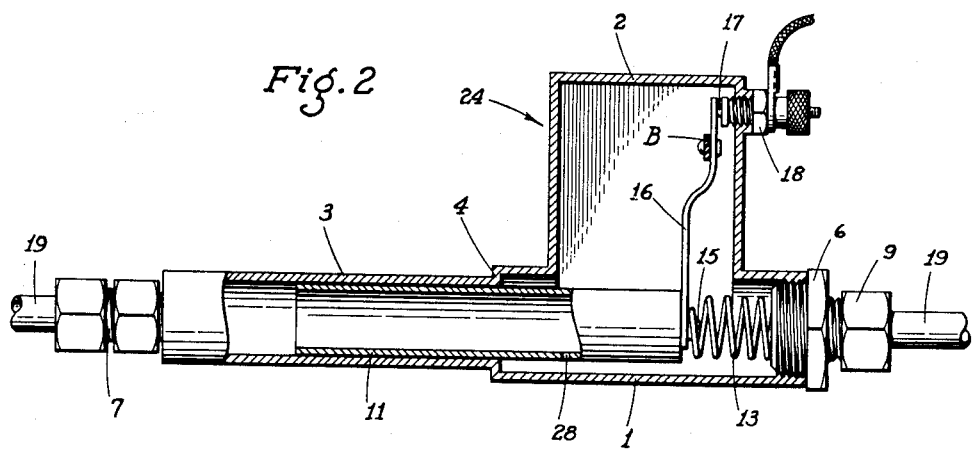
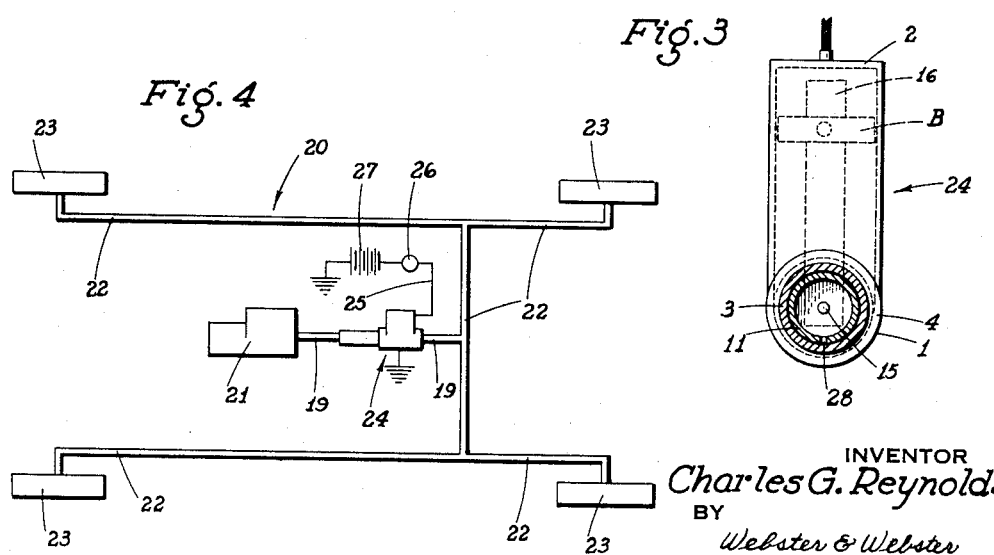
INVENTOR
Charles G. Reynolds
BY
Webster & Webster
ATTYS

United States Patent Office 2,734,960
Patented Feb. 14, 1956

2,734,960

SAFETY SIGNAL DEVICE FOR HYDRAULIC BRAKE SYSTEMS

Charles G. Reynolds, Modesto, Calif.

Application October 5, 1953, Serial No. 384,080

2 Claims. (Cl. 200—82)

This invention is directed to, and it is a major object to provide, a novel device to warn the operator of a motor vehicle of a failure in the hydraulic brake system; the device being operative, when the brakes are applied and upon occurrence of any substantial hydraulic fluid loss in the system, to cause actuation of an electric warning signal located in the operator's compartment of the vehicle.

Another important object of this invention is to provide a safety signal device, for a hydraulic brake system, which includes a cylinder and floating piston assembly interposed in the primary or main feed conduit of the system; the piston being actuated by the hydraulic fluid flow in said conduit, and having limited travel in the piston under normal braking conditions, but greater travel should there be any substantial hydraulic fluid loss in the system beyond said assembly. The device embodies a signal circuit in which a normally open switch is present, and the piston is arranged to cause closing of the switch only in the event of such greater-than-normal travel of said piston.

An additional object of the invention is to provide a safety signal device, for a hydraulic braking system, wherein the cylinder and floating piston assembly, together with the switch, are arranged in a novel compact unitary structure adapted for ready installation in connection with the primary or main feed conduit of any conventional hydraulic brake system.

A further object of the invention is to provide a safety signal device, for the purpose described, which is designed for ease and economy of manufacture.

A still further object of the invention is to provide a safety signal device, for a hydraulic braking system, which requires no attention after installation, consumes no electric current when not in use, and yet stands ready at all times to warn of a failure in the brake system.

Still another object of the invention is to provide a practical and reliable safety signal device, for a hydraulic braking system, and one which will be exceedingly effective for the purpose for which it is designed.

These objects are accomplished by means of such structure and relative arrangement of parts as will fully appear by a perusal of the following specification and claims.

In the drawings:

Fig. 1 is a longitudinal sectional elevation of the device showing the parts in their normal retracted positions.

Fig. 2 is a similar view, but shows the parts as fully advanced, as when the brake system has failed; the switch being closed.

Fig. 3 is a transverse cross sectional elevation on line 3—3 of Fig. 1.

Fig. 4 is a diagrammatic view showing the position occupied by the device in a hydraulic brake system; the view additionally illustrating the circuit.

Referring now more particularly to the drawings, and to the characters of reference marked thereon, the device comprises a relatively short tubular body 1 having a switch box 2 projecting laterally therefrom; the switch box being open at its inner end and in communication with the body 1 but otherwise fully enclosed.

An elongated cylinder 3 of slightly lesser diameter than the tubular body 1 is shoulder-connected, as at 4, with one end of said tubular body 1, and thence projects axially outwardly therefrom. The cylinder 3 is open at its inner end, as shown, but is closed at the outer end, as at 5. At the end opposite the cylinder 3 the tubular body 1 is closed by a plug 6.

A fitting 7 is attached to the outer end of the cylinder 3 and has a tubular neck 8 establishing communication through said end. Another fitting 9 is formed with the plug 6 and provides an axial passage 10 communicating with the interior of the body 1.

An elongated floating piston 11 is slidably disposed in the cylinder 3; such piston being open at its outer end; i. e., at the end adjacent the fitting 7. The inner end of the piston 11 is closed, being indicated at 12.

A compression spring 13 extends lengthwise in the tubular body in engagement between the closed end 12 of piston 11 and the plug 6; the latter having a socket 14 which receives the adjacent end portion of the spring 13 in locating relation. The other end of the compression spring 13 is secured centrally to the closed end 12 of piston 11 by a headed screw 15.

The spring 13 is normally under sufficient compression to maintain the piston 11 in its fully retracted position, as in Fig. 1.

A switch blade 16 is secured to the closed end 12 of piston 11 by the screw 15, and such switch blade 16 radiates from said piston 11 in a direction to project into the switch box 2. The dimensions of the switch blade 16 are such that it makes no contact with any portion of the switch box 2 upon to or fro motion of the piston 11.

Upon full advance of the piston 11 as in Fig. 2, from its retracted position as in Fig. 1, the switch blade moves in the box 2 a distance to engage a contact point 17 secured in insulated relation on the switch box 2 by means of a terminal 18.

A cross bar B of dielectric material is secured to the switch blade 16 intermediate its ends; such cross bar projecting laterally beyond opposite sides of said switch blade 16 to points closely adjacent the corresponding sides of the switch box 2. This maintains the switch blade 16 in clearance relation to the sides of the switch box 2 without limiting to and fro motion of said blade.

In use of the above described device it is interposed, by means of the fittings 7 and 9, in the primary or main feed conduit 19 of a hydraulic brake system, indicated generally at 20 in Fig. 4.

The primary or main feed conduit 19 connects between the conventional master cylinder 21 and a branched conduit assembly 22 which leads to and feeds the wheel brake units 23. In the diagrammatic showing of Fig. 4 the safety signal device is indicated generally at 24.

When the safety signal device 24 is interposed in the conduit 19, the terminal 18 is connected to a circuit 25 having an electric signal 26 and a battery 27 connected therein in series; the battery preferably being the conventional storage battery which the motor vehicle carries.

With the arrangement shown, the circuit 25 is grounded at one end and connects to the terminal 18 at the other end; the circuit thus normally lying open. However, upon engagement of the switch blade 16 with the contact point 17 the circuit is completed to ground and the electric signal 26 is energized from the battery 27; the electric signal preferably being a bell or buzzer located in the operator's compartment.

With each application of the brakes, with resultant feeding of hydraulic fluid under pressure from the master cylinder 21 through conduit 19, the piston 11 floats in the cylinder 3; i. e., advances a limited distance. However, as long as the brake system beyond the safety signal device 24 is full of hydraulic fluid, the normal distance of advance of the piston 11, when the brakes are applied, is not sufficient to move switch blade 16 into engagement with the contact point 17, so that the safety signal circuit is normally inactive.

Upon the occurrence of any failure in the brake system 20 beyond the device 24, with any substantial loss of hydraulic fluid, the piston 11—upon the occurrence of the next application of the brakes—advances a greater-than-normal distance because of the then existent differential in pressures on opposite sides thereof. With such greater-than-normal advance of the piston 11 the switch blade 16 engages the contact point 17, closing the circuit 25, whereupon the electric signal 26 is energized, warning the operator of brake failure and the attendant danger.

The device is mounted with housing 2 projecting upwardly, and a sufficient air dome exists in the top of such housing so that the switch parts contact in the presence of air.

In order to assure that the hydraulic brake system 20 beyond the device 24 be normally maintained full of hydraulic fluid, to compensate for minor operational losses, the following arrangement is provided:

The piston 11 is formed in one side thereof with a bleed opening or port 28 which is closed by the cylinder 3 when said piston is retracted, but which bleed opening moves into communication with the tubular body 1 when the piston 11 moves forward with its normal but limited advance upon application of the brakes. In this latter position of the bleed opening 28, hydraulic fluid may transfer from within the piston 11, through bleed opening 28, into tubular body 1, and thence flow to the conduit assembly 22, maintaining the latter full, as is desirable. Additionally, the bleed opening 28 is effective for use in initially filling the system with hydraulic fluid.

With the above described device a warning signal is given to the operator of the vehicle, when he applies the brakes, if there has been any substantial loss of the hydraulic fluid in the brake system, thus making it possible to avoid danger attendant continued use of the defective brake system.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A circuit closer comprising a body including an elongated cylinder having opposed end ports adapted for connection to intake and outlet conduits, a piston slidable in the cylinder, a spring yieldably urging the piston to a retracted position adjacent the intake end of the cylinder, a closed housing formed with the body at the outlet end thereof and communicating with the cylinder in upstanding relation thereto, the upper portion of the housing forming an air dome, a terminal of an electric circuit mounted in the housing in said upper portion thereof, the piston when retracted projecting into the housing a short distance, the terminal facing the intake end of the cylinder, a yieldable blade secured on the projecting end of the piston and projecting upwardly in opposed relation to the terminal for engagement therewith only upon advance of the piston a predetermined distance from a retracted position; the blade being relatively narrow compared to the width of the housing, and a cross bar of dielectric material having a clearance fit with the sides of the housing whereby to maintain the blade alined with the terminal irrespective of any tendency of the piston to turn in the cylinder.

2. A circuit closer comprising a body including an elongated cylinder having opposed end ports adapted for connection to intake and outlet conduits, a piston slidable in the cylinder, a spring yieldably urging the piston to a retracted position adjacent the intake end of the cylinder, the body terminating at its outlet end in a portion of enlarged size relative to the cylinder and said cylinder terminating and being connected to said portion, circuit closing means on the body and piston closed only upon advance of the piston a predetermined distance from its retracted position, and passage means in the piston extending therein from an open end at the intake end of the piston to a relatively small peripheral port at a point in the length of the piston such that said port will be exposed in the large-sized portion of the body only upon advance of the piston from a retracted position a predetermined distance less than that necessary to close the circuit closing means.

References Cited in the file of this patent

UNITED STATES PATENTS

| | | |
|---|---|---|
| 1,132,791 | Pagano | Mar. 23, 1915 |
| 2,239,348 | Wirtanen et al. | Apr. 22, 1941 |
| 2,332,301 | Cox | Oct. 19, 1943 |
| 2,583,814 | Burklin | Jan. 29, 1952 |